United States Patent [19]

Reichert et al.

[11] Patent Number: 4,710,404

[45] Date of Patent: Dec. 1, 1987

[54] SOLVENT-FREE COATING COMPOSITION AND PROCESS FOR PROTECTING A SURFACE FROM CORROSION

[75] Inventors: William W. Reichert, Freehold; Charles A. Cody, East Windsor; Michael A. Desesa, Fair Haven; Bruce K. Faulseit, Mount Holly, all of N.J.

[73] Assignee: NL Chemicals, Inc., Hightstown, N.J.

[21] Appl. No.: 884,635

[22] Filed: Jul. 11, 1986

Related U.S. Application Data

[63] Continuation-in-part of Ser. No. 753,456, Jul. 10, 1985, Pat. No. 4,615,918.

[51] Int. Cl.$^4$ .......................... B05D 3/02; C04B 9/02; B66D 3/04
[52] U.S. Cl. ................................ 427/386; 106/14.05; 106/14.34; 106/14.39; 252/389.24; 252/389.3; 252/389.4; 252/389.52; 252/389.54; 252/389.61; 252/396; 427/385.5; 427/388.1; 427/388.2
[58] Field of Search ............... 427/385.5, 388.1, 388.2, 427/386; 106/14.05, 14.34, 14.39; 252/389.1, 389.24, 389.3, 389.4, 389.52, 389.54, 389.61, 396

[56] References Cited

U.S. PATENT DOCUMENTS

| | | | |
|---|---|---|---|
| 2,544,236 | 3/1951 | Reimert et al. | 252/301.6 |
| 2,579,020 | 12/1951 | Smith | 106/288 |
| 2,597,406 | 5/1952 | Thome-Johannesen | 148/6.15 |
| 3,558,273 | 1/1971 | Beck | 23/105 |
| 3,852,087 | 12/1974 | Nordyke et al. | 106/288 B |
| 3,869,299 | 3/1979 | Periard et al. | 106/306 |
| 3,923,712 | 12/1975 | Vickery | 106/296 X |
| 3,960,611 | 6/1976 | Walker et al. | 148/6.15 R |
| 3,996,142 | 12/1976 | White et al. | 252/8.1 |
| 4,108,811 | 8/1978 | Eckhoff | 524/432 |
| 4,159,207 | 6/1979 | Nuss | 106/296 X |
| 4,217,142 | 8/1980 | Mayne et al. | 106/14.36 |
| 4,243,416 | 1/1981 | Grourke et al. | 524/432 |
| 4,243,417 | 1/1981 | Grourke et al. | 524/432 |
| 4,256,811 | 3/1981 | Black | 524/432 |
| 4,428,774 | 1/1984 | Drake et al. | 106/14.39 |
| 4,464,502 | 8/1984 | Jacobs | 524/432 X |
| 4,469,521 | 9/1984 | Salensky | 106/296 |

FOREIGN PATENT DOCUMENTS 58-104930 6/1983 Japan .................. 524/432

Primary Examiner—Thurman K. Page
Attorney, Agent, or Firm—Burns, Doane, Swecker & Mathis

[57] ABSTRACT

A solvent-free coating composition useful for increasing the corrosion resistance of a surface is provided. The composition comprises a solvent-free coating material and an anti-corrosive agent comprised of a calcined mixture consisting essentially of magnesium oxide and zinc oxide with or without calcium oxide. The composition may also include a defined compound which can improve the corrosion resistance and fillers.

45 Claims, No Drawings

SOLVENT-FREE COATING COMPOSITION AND PROCESS FOR PROTECTING A SURFACE FROM CORROSION

CROSS-REFERENCE TO RELATED APPLICATIONS

This is a continuation-in-part of pending application Ser. No. 753,456 filed July 10, 1985. and now U.S. Pat. No. 4,615,918.

BACKGROUND OF THE INVENTION

1. Field of the Invention

The present invention relates to a solvent-free coating composition that includes a non-pigmentary anti-corrosive agent which protects a surface from corrosion and to a process of using the composition.

2. Description of the Prior Art

It is known in the art to provide materials in coating compositions which impart corrosion resistance to surfaces coated by the compositions. For example, in U.S. Pat. No. 3,846,148, there is disclosed composite pigments which are stated as having excellent corrosion inhibition and tannin absorptive properties. The composite pigments comprise an inert silicate mineral base pigment having adhered to the particles thereof and in intimate association therewith at least one additive compound which may be a basic or hydrated metal phosphate, phosphite, borate or chromate.

A different type of corrosion inhibiting pigment which may be used in an anti-corrosion paint is that set forth in U.S. Pat. No. 4,140,538. This type of pigment comprises about 50 to 70 mole % of an oxide of at least one metal selected from the group consisting of magnesium, calcium and zinc, about 70 to 30 mole % of $Fe_2O_3$ and up to 20 mole % of $Cr_2O_3$ and is formed by calcining the metal-containing compounds of materials yielding the metal oxides on calcination. Other illustrations of iron oxide-based anti-corrosive pigments may be found in U.S. Pat. No. 3,904,421, German Pat. Nos. 2,560,072, 2,560,073, 2,642,049 and 2,815,306 and Japanese Kokai Nos. 49-93414, 49-100107 and 50-12600.

Anti-corrosion pigments are also described in U.S. Pat. No. 4,156,613. The pigments are comprised of:
(a) about 30 to 70 mole percent of at least one of MgO, ZnO and CaO, and
(b) about 70 to 30 mole percent of $Me_2O_3$ wherein $Me_2O_3$ has the approximate molar percent composition $Fe_2O_3$ 0-100 mole %, $Al_2O_3+Mn_2O_3$ 0-100% and $Cr_2O_3$ 0-20 mole %.

An anti-corrosion paint is described in French Pat. No. 2,475,565. The paint contains 15 parts MgO with 100 parts of a 15% aqueous dispersion of polybutadiene as the active agents.

An indoor/outdoor wallpaint is described in French Pat. No. 1,506,784. The wallpaint contains carbon dioxide-free dolomite, silica gel, magnesium oxide and sodium chloride.

While unrelated to coating compositions, U.S. Pat. No. 4,360,624 describes a calcined solid solution of zinc oxide and magnesium oxide and/or calcium oxide which is added to a plastic composition as a smoke and/or fire retardant agent.

OBJECTS AND SUMMARY OF THE INVENTION

Accordingly, it is a general object of the present invention to provide a novel solvent-free coating composition which increases the corrosion resistance of a surface to which it is applied.

It is a more specific object of the present invention to provide a solvent-free coating composition which imparts excellent corrosion protection for a surface as determined by salt fog spray and outdoor exposure tests.

It is a further object of the present invention to provide a corrosion-resisting solvent-free coating composition which has excellent shelf life and thermal stability.

It is a still further object of the present invention to provide a solvent-free coating composition which imparts corrosion resistance to a surface and displays excellent blister resistance and film integrity.

It is a still further object of the present invention to provide a solvent-free coating composition that exhibits excellent adhesion to a surface.

It is a still further object of the present invention to provide a solvent-free coating composition which includes a non-pigmentary anti-corrosive agent that exhibits low oil adsorption.

It is a still further object of the present invention to provide a solvent-free coating composition which contains a non-pigmentary anti-corrosive agent that does not require an iron oxide as an essential component.

It is a yet further object of the present invention to provide a process for imparting corrosion resistance to a surface.

In one aspect, the present invention provides a solvent-free coating composition for protecting a surface from corrosion. The composition comprises:
(a) a solvent-free coating material; and
(b) a non-pigmentary anti-corrosive agent comprised of a calcined mixture consisting essentially of from about 5 to about 95% by weight of magnesium oxide and from about 5 to about 95% by weight of zinc oxide.

In another aspect, the present invention provides a solvent-free coating composition for protecting a surface from corrosion. The composition comprises:
(a) a solvent-free coating material; and
(b) a non-pigmentary anti-corrosive agent comprised of a calcined mixture consisting essentially of
  (i) from about 5 to about 95% by weight of magnesium oxide and from about 5 to about 95% by weight of zinc oxide wherein the percentages are based on the total amount of (i), and
  (ii) calcium oxide
wherein the amount of (i) is from about 10 to about 99 parts by weight and the amount of (ii) is from about 1 to about 90 parts by weight with the sum of the amounts of (i) and (ii) being 100 parts by weight.

In a further aspect, the present invention provides a process for protecting a surface from corrosion.

Further advantages and features of the invention as well as the scope, nature and utilization of the invention will become apparent to those skilled in the art from the description of the preferred embodiments of the invention set forth below.

DESCRIPTION OF THE PREFERRED EMBODIMENTS

As stated hereinabove, one aspect of the present invention relates to a solvent-free coating composition for increasing the corrosion resistance of a surface wherein the coating composition comprises a solvent-free coating material and a non-pigmentary anti-corrosive agent (i.e., an agent which imparts corrosion resistance properties to the composition).

The coating material is present in the composition in an amount ranging from about 25 to about 99% by weight, preferably from about 50 to about 90% by weight of the overall composition. The coating material may be any known solvent-free coating material which is not deleteriously affected by the presence of the anti-corrosive agent. Typical coating materials include alkyd-based paints, oil/alkyd-based paints, epoxies, polyesters and mixtures thereof. While such types of coating materials may be formulated with organic solvents, the present application encompasses solvent-free embodiments of such coating materials. The coating material may also be solvent-free urethane based paint, either alone or in combination with other solvent-free coating materials, or powder coating materials which are typically electrostatically applied, thermosetting coatings based on systems such as polyethylene, polyvinyl chloride, epoxy resin, polyamide resin, cellulose butyrate and polyester resin.

As used herein, the term "solvent-free" encompasses those coating compositions which may contain small amounts of solvent used to incorporate any of the ingredients into the composition. However, the term does not encompass typical solvent-based systems which experience about a 10 to 25% loss of weight due to the evaporation of the organic solvent. A further discussion of illustrative coating materials of which many are commercially available is set forth in the Federation Series on Coatings Technology, the contents of which are incorporated by reference.

Preferred coating materials are oleoresinous systems, exemplified by oil/alkyd systems, epoxy systems and urethane systems. Oil/alkyd systems are generally based on a combination of a drying oil and an alkyd resin which is the reaction product of a polybasic acid, a polyhydric alcohol and a monobasic fatty acid or oil. Epoxy systems are generally based on bifunctional diglycidyl ethers cross-linked with an amine or polyamine while urethane systems are generally based on the polymer reaction product of a polyol cross-linked with a multifunctional isocyanate. Polyester systems are typically based on the reaction product between polyols and difunctional carboxylic acids cross-linked with a reactive monomer such as styrene.

The non-pigmentary anti-corrosive agent used in the present invention is present in an amount ranging from about 1 to about 75%, preferably from about 10 to about 50% by weight of the solvent-free coating composition. In one aspect of the present invention, the anti-corrosive agent is a calcined mixture consisting essentially of magnesium oxide and zinc oxide. In a further aspect of the present invention, the anti-corrosive agent is a calcined mixture consisting essentially of magnesium oxide, zinc oxide and calcium oxide.

The non-pigmentary anti-corrosive agent of the present invention may be contrasted with anti-corrosive pigments known in the art. Such pigments, exemplified by $CaFe_2O_4$, $MgFe_2O_4$ and $ZnFe_2O_4$ are characterized by high hiding power, high tint strength and are highly colored. The non-pigmentary anti-corrosive agent of the present invention on the other hand is characterized by low hiding power, low tint strength and is essentially white. Thus, for example, the non-pigmentary anti-corrosive agent of the present invention will typically have a tint strength of less than about 10% (e.g., from about 5 to about 10%) of the tint strength of titanium dioxide as determined by ASTM method D2745-80 entitled "Instrumental Tinting Strength of White Pigments".

Due to the non-pigmentary characteristic of the anti-corrosive agent, additional colorants do not have to be added to the composition in order to mask the color of the anti-corrosive agent. This reduces the cost of the composition and can permit higher loadings of the anti-corrosive agent in the composition. It can therefore be understood that the anti-corrosive agent of the present invention is substantially free of amounts of iron oxide and other materials which will materially affect the pigmentary and anti-corrosive characteristics of the agent.

The amounts of magnesium oxide and zinc oxide in the calcined mixture are such that of the total weight of these components, from about 5 to about 95% by weight is magnesium oxide and from about 5 to about 95% by weight is zinc oxide. Preferably, from about 20 to about 80% by weight is magnesium oxide and from about 20 to about 80% by weight is zinc oxide and most preferably from about 50 to about 70% by weight is magnesium oxide and from about 30 to about 50% by weight is zinc oxide.

In that aspect of the present invention wherein calcium oxide is calcined with the magnesium oxide and zinc oxide, the total amount of magnesium oxide and zinc oxide is from about 10 to about 99 parts by weight and the total amount of the calcium oxide is from about 1 to about 90 parts by weight on a 100 parts by weight basis. The preferred amounts of the sum of magnesium oxide and zinc oxide with the calcium oxide generally depends on the coating composition in which it is to be used. For example, in oleoresinous systems, the preferred amount of the total weight of magnesium oxide and zinc oxide is from about 90 to about 98 parts by weight and the amount of calcium oxide is from about 2 to about 10 parts by weight on a 100 parts by weight basis.

Illustrative anti-corrosive agents of the present invention have the following compositions on a 100 parts basis:

(a) 95% by weight MgO and 5% by weight ZnO
(b) 80% by weight MgO and 20% by weight ZnO
(c) 60% by weight MgO and 40% by weight ZnO
(d) 95 parts by weight of which 60% by weight is MgO and 40% by weight is ZnO and 5 parts by weight of CaO
(e) 50 parts by weight of which 70% by weight is MgO and 30% by weight is ZnO and 50 parts by weight of CaO
(f) 25 parts by weight of which 60% by weight is MgO and 40% by weight is ZnO and 75 parts by weight is CaO Of the total amount of magnesium oxide, zinc oxide and calcium oxide, if present, up to about 10% (e.g., from about 1 to about 10%) by weight of at least one of these constituents may be replaced by at least one of molybdenum trioxide, barium oxide and strontium oxide in the mixture which is then calcined. Thus, for example, in a situation where there is 100 pounds of an anti-corrosive agent having composition (e), up to about 3.5 pounds of the MgO, up to about 1.5 pounds of the ZnO and/or up to about 5.0 pounds of the CaO can be replaced with at least one of the molybdenum trioxide, barium oxide and strontium oxide.

The anti-corrosive agent may be prepared by mixing zinc oxide and the calcium oxide, if present, into an aqueous magnesium hydroxide slurry or aqueous magnesium oxide slurry wherein the resulting mixture contains from about 10 to about 50% by weight of solids. The mixture can also be prepared by mixing the magnesium oxide, zinc oxide and calcium oxide, if present, into water in any order. The mixture is filtered, preferably at a slightly elevated temperature of from about 50 to about 90 C. to aid filtration, may optionally be dried at an elevated temperature and the dried cake may be broken up and then calcined at a temperature and for a time such that the desired mixture is obtained. The mixture can also be prepared by dry blending the various components.

While temperatures up to about 1200° C. can be used, calcining is typically done from about 400° to about 1100° C., preferably from about 900° to about 1000° C., for a period of time ranging from between ½ to 8 hours. The calcining conditions are selected such that the resulting anti-corrosive agent exhibits anti-corrosive properties which are superior to the uncalcined mixture. For example, the filter cake or dry mixture can be calcined at about 950° C. for about 2 hours in order to obtain a suitable product. The product may then be milled (e.g., in a hammer mill) to obtain particles having an average diameter in the range of from about 0.2 to about 25 microns, preferably from about 1 to about 10 microns.

As should be apparent, other compounds containing the metals, such as metal hydroxides, metal carbonates and metal salts, which will result in the oxides in the calcined mixture can similarly be employed. For example, limestone or slaked lime may be used as a source of calcium oxide. Similarly, magnesium carbonate or magnesium hydroxide may be used as a source for magnesium oxide and zinc hydroxide or basic zinc carbonate may be used as a source for zinc oxide. A further discussion of techniques useful in the preparation of the calcined mixture may be found in aforementioned U.S. Pat. No. 4,360,624, the contents of which are incorporated by reference.

The calcined anti-corrosive agent of the present invention exhibits anti-corrosive and paint and paint film properties that are far superior from those obtained by mixing the same oxides in the same proportions, but without heating (i.e., calcining) them. Although applicants do not wish to be bound by any theory, it is believed that the zinc oxide dissolves into the magnesium oxide and forms a solid solution. On a molecular level, this can be described as an interpenetration of the magnesium oxide and zinc oxide crystal lattices. Evidence supporting this understanding are X-ray diffraction patterns of mixtures calcined above about 900° C. which show a decrease in the intensity of the peaks due to the zinc oxide and a shift in the atomic spacing of the magnesium oxide lattice which indicates the presence of a zinc oxide/magnesium oxide solid solution. In the event that calcium oxide is present, it is further believed that the calcium oxide becomes incorporated into the magnesium oxide and zinc oxide lattices and the magnesium oxide and zinc oxide similarly is incorporated into the calcium oxide lattice. Although X-ray diffraction patterns of mixtures calcined at lower temperatures (e.g., about 450° C.) do not clearly show this phenomenon, it is nonetheless probably occurring albeit to a lesser extent.

In addition to the solvent-free coating material and the anti-corrosive agent, the solvent-free coating composition may contain at least one compound formed from a divalent, trivalent or tetravalent metal cation and an anion selected from phosphates, phosphites, borates, borophosphates, borophosphites and mixtures thereof. Preferred compounds are calcium phosphate, calcium borate, calcium phosphite, zinc phosphite, zinc phosphate, zinc borate, magnesium phosphite and mixtures thereof. The most preferred compound is crystalline calcium phosphite. The presence of these uncalcined compounds improves the anti-corrosion activity of the coating composition and particularly helps suppress spot rusting.

The compound is a substitute for from about 1 to about 40%, preferably from about 10 to about 25% of the calcined anti-corrosive agent. Thus, for example, in 100 lbs of a solvent-free coating composition which contains 40 lbs. of the calcined anti-corrosive agent, up to about 16 lbs. of the calcined anti-corrosive agent can be replaced with at least one of the defined compounds. In a further example, the anti-corrosive agent may be a calcined mixture of 95 parts by weight of magnesium oxide (60%) and zinc oxide (40%) and 5 parts by weight of calcium oxide which is used with crystalline calcium phosphite in a ratio of 4:1. The same ratio may be used with a similar anti-corrosive agent which is prepared from the same percentages of magnesium and zinc oxide without the presence of calcium oxide.

The compound may be directly incorporated into the solvent-free coating composition or may be first dry blended with the anti-corrosive agent which blend is then added to the solvent-free coating composition.

Additionally, up to about 10% (e.g., from about 1 to about 10%) by weight of the anti-corrosive agent can be substituted with at least one of molybdenum trioxide, strontium oxide, barium oxide and calcium oxide in the uncalcined state.

To the solvent-free coating composition may also be added fillers which may or may not have pigmentary properties. Such fillers are exemplified by talc, silica, barium sulfate, calcium sulfate, calcium carbonate, calcium silicate, titanium dioxide, iron oxides, mica, aluminum silicate, clay and mixtures thereof. The preferred extenders are calcium carbonate, iron oxides, titanium dioxide, talc and mixtures thereof.

The fillers are present in an amount ranging from about 1 to about 74% by weight, preferably from about 15 to about 35% by weight of the solvent-free coating composition with the proviso that the total amount of (1) the anti-corrosive agent, (2) the uncalcined compound (if any is present) which can partly be a substitute for the anti-corrosive agent and (3) the filler should not exceed about 75% by weight of the total composition. However, the amount of this filler does not include the amount of filler which may already be present in the solvent-free coating material such as those commercially available.

The fillers may be separately added to the solvent-free coating composition or may be wet or dry blended with the anti-corrosive agent before it is added to the composition or may be wet or dry blended with the components forming the anti-corrosive agent before they are activated by calcining. However, as indicated above, substantial amounts of iron oxides or other materials which would materially affect the non-pigmentary and anti-corrosive characteristics of the agent cannot be present during calcination of the components forming the anti-corrosive agent.

The solvent-free coating composition of the present invention may further include other known materials, such as driers, antioxidants, gellants, fungicides, etc. in known amounts suitable for their intended function and solvents for the driers, anti-oxidants, fungicides, etc. in an amount sufficient to achieve their incorporation into the composition. Thus, for example, an organic salt (e.g., an octoate or naphthenate) of a metal (e.g., cobalt, calcium, zirconium, manganese, lead, bismuth or antimony) available from Nuodex Corporation under the name "Nuxtra" can be used as a drier in order to catalyze the oxidative polymerization of unsaturated prepolymers. Similarly, an anti-oxidant, such as methyl ethyl ketoxime available under the name "Eskin No. 2" from Nuodex Corporation, can be added to prevent surface oxidation in the coating composition.

To prepare the solvent-free coating composition, the anti-corrosive agent can be first wet (i.e., with a small amount of organic solvent) or dry blended for a sufficient period of time (e.g., up to about 2 hours) with the other materials (e.g., the filler and/or additional compound and/or other conventional components) and this mixture may then be mixed into the solvent-free coating material. Alternatively, the anti-corrosive agent may be added to the solvent-free coating material separate from the other components in any order of addition.

The surfaces to which the solvent-free coating composition may be applied may be composed of any material or combination of materials which are subjected to an environment in which they will eventually corrode. Typical materials include metallic surfaces especially ferrous metal surfaces exemplified by hot rolled steel, cold rolled steel, galvanized iron and mixtures thereof. Such materials are commonly used in outdoor environments wherein they are exposed to rain, wind and sun and, if near bodies of salt water, may also be exposed to salt water spray. Similar high humidity or otherwise aggressive atmospheres may also be found in certain indoor environments.

The solvent-free coating compositions of the present invention are applied to the aforementioned surfaces and are permitted to harden to obtain a thickness which is appropriate for the coating composition used. Thus, for example, polyester and urethane system compositions may be applied to form a hardened thickness of from about 5 to about 150 microns, preferably from about 15 to about 100 microns and most preferably from about 25 to about 50 microns. Oil/alkyd system compositions may be applied to form a hardened thickness of from about 25 to about 150 microns, preferably from about 25 to about 100 microns and most preferably from about 35 to about 75 microns, while epoxy system compositions may be applied to form a hardened thickness of from about 25 to about 500 microns, preferably from about 25 to about 250 microns and most preferably from about 25 to about 150 microns.

Due to the presence of the anti-corrosive agent, the hardened coating provides excellent corrosion protection for the surfaces when they are exposed to salt fog sprays and other outdoor exposure tests. Additionally, the anti-corrosive agents have low oil absorption and therefore can be heavily loaded into the composition and can be prepared in sufficiently small particle size to be readily incorporated into solvent-free coating materials via standard mixing techniques. The resulting compositions display a long shelf life and have excellent heat stability. The coating compositions additionally display excellent blister resistance, film integrity and adhesion to the surface.

The degree of anti-corrosion performance of the solvent-free coating composition of the present invention can be measured by two standard ASTM methods, namely ASTM D610-68 entitled "Evaluating Degree of Rusting on Painted Steel Surfaces" and ASTM D714-56 entitled "Evaluating Degree of Blistering of Paints." The coating composition can also be tested in accordance with ASTM method B117-73 entitled "Method of Salt Spray (Fog) Testing" wherein the composition is applied onto steel panels which are scribed and subjected to salt fog spray. Scribing is achieved by scratching an "X" in the coating through to bare steel using a tungsten carbide cutting tool. The amount of corrosion at the scribe is assessed on a scale of 1–10 where 10 is no corrosion and 1 is complete failure where the whole area associated with the scribe is rusting. Ratings of 5 and above are acceptable for anti-corrosive compositions. An oil/alkyd coating which does not contain an anti-corrosive agent will deteriorate to a 1 rating within 300 hours of salt fog exposure.

Rust ratings may also be done on the unscribed area of the coated panel.

Blistering in the coatings is assessed in accordance with ASTM D714-56. This method describes blister size as numbers 2, 4, 6, 8, and 10, where 2 is a large blister, ¼ inch or larger in diameter, 8 is a small blister less than 1/16 inch in diameter and 10 is the absence of blistering. Blister density is described as D=dense, MD=medium dense, M=medium, and F=few. Blister ratings of worse than 6F are generally regarded as unacceptable in anti-corrosive compositions.

Having thus been disclosed, the present invention is exemplified in the following examples. It is to be understood, however, that the present invention is not to be limited to the specifics thereof.

EXAMPLE 1

A reaction vessel constructed of stainless steel and fitted with a mechanical stirrer is charged with 2000 ml of water and 2.5 grams of Tamol 731 (which is a dispersant that is a sodium salt of polymeric carboxylic acid available from Rohm and Haas Company). To this homogeneous mixture is added 600 grams of magnesium oxide and 400 grams of zinc oxide at room temperature. After the slurry is stirred at room temperature for 30 minutes, the solids are filtered under vacuum. The filter cake is dried in an oven at 120° C. for 18 hours. The dried filter cake is broken up and calcined in a ceramic tray in an oven at 950° C. for 2.5 hours. After cooling, the solid solution product is hammer milled through a 0.02 inch screen to break up the agglomerates.

180 grams of the anti-corrosive agent is dry blended with 60 grams of pigmentary grade calcium carbonate and 60 grams of finely ground calcium phosphite to yield extender and salt loading levels of 20% and 20%, respectively, of the total weight.

The anti-corrosive agent is added to an epoxy formulation. The epoxy paint formulation is prepared using the following formula:

| Ingredient | Generic Name | Manufacturer | Formulation (pounds)[1] |
|---|---|---|---|
| Araldite 6010 | Epoxy Resin M.W. 380 | Ciba-Geigy | 500.0 |
| Pfizer R-2899 | Red Iron Oxide | Pfizer | 100.0 |
| Anti-corrosive Agent of Example 1 | | | 100.0 |

Disperse at High Speed for 15 minutes to obtain a Hegman Gauge Reading of 4 N.S. and add:

-continued

| Ingredient | Generic Name | Manufacturer | Formulation (pounds)[1] |
|---|---|---|---|
| Ethylene Diamine | | Aldrich | 80.0 |

[1]Basic formulation; actual amounts used are much less but proportional.

The above formulation is allowed to stand for 5 minutes after mixing and the paint is applied to cold rolled steel panels to give a hardened film thickness of 75 microns. The hardened paint film exhibits good adhesion properties.

A salt fog evaluation is conducted to demonstrate the anti-corrosive properties of the solvent-free composition containing the anti-corrosive agent. These results are summarized in Table 1. Properties are tested in accordance with the procedures:

| Test | ASTM Method |
|---|---|
| Salt Fog Exposure | B117-73 |
| Rusting | D610-68 |
| Blistering | D714-56 |

COMPARATIVE EXAMPLE A

In this Comparative Example, no anti-corrosive agent is added to the epoxy formulation described in Example 1.

The epoxy paint is prepared according to the following formula:

| Ingredient | Generic Name | Manufacturer | Formulation (pounds)[1] |
|---|---|---|---|
| Araldite 6010 | Epoxy Resin M.W. 380 | Ciba-Geigy | 500.0 |
| Pfizer R-2899 | Red Iron Oxide | Pfizer | 200.0 |
| Disperse at High Speed for 15 minutes to obtain a Hegman Gauge Reading of 4 N.S. and add: | | | |
| Ethylene Diamine | | Aldrich | 80.0 |

[1]Basic formulation; actual amounts used are much less but proportional.

The above formulation is allowed to stand for 5 minutes after mixing and the paint is applied to cold rolled steel panels to give a hardened film thickness of 75 microns.

A salt fog evaluation is conducted. These results are summarized in Table 1. Properties are tested in accordance with the procedures:

| Test | ASTM Method |
|---|---|
| Salt Fog Exposure | B117-73 |
| Rusting | D610-68 |
| Blistering | D714-56 |

TABLE 1

Salt Fog Exposure Results (300 Hours)

| Sample Description | Blistering[2] Scribe | Blistering[2] Panel | Rusting Scribe | Rusting Panel |
|---|---|---|---|---|
| Example 1 | 8F | 8VF | 8 | 10 |
| Comparative Example A | 6F | 8VF | 6 | 8 |

[2]In a modified frequency rating system of that described in ASTM Method D714-56. V stands for very (VF = very few).

EXAMPLE 2

The anti-corrosive agent of Example 1 is incorporated in a 100% solids 4:1 oil/alkyd formulation described below:

| Ingredient | Generic Name | Manufacturer | Formulation (pounds)[1] |
|---|---|---|---|
| Raw Linseed Oil | Raw Linseed Oil | Spencer Kellogg | 150.0 |
| Aroplaz 1271 | 100% Solids Alkyd Resin | Spencer Kellogg | 78.4 |
| Pfizer R-2899 | Red Iron Oxide | Pfizer | 100.0 |
| Anti-corrosive Agent of Example 1 | | | 500.0 |
| Disperse at High Speed for 15 minutes to obtain a Hegman Gauge Reading of 4 N.S. and add: | | | |
| Raw Linseed Oil | Raw Linseed Oil | Spencer Kellogg | 159.0 |
| 6% Manganese Nuxtra | Drier | Nuodex | 2.6 |
| 6% Zirconium Nuxtra | Drier | Nuodex | 9.7 |
| 6% Cobalt Nuxtra | Drier | Nuodex | 2.6 |

[1]Basic formulation; actual amounts used are much less but proportional.

The above formulation is applied to cold rolled steel panels to give a hardened film thickness of 37.5 microns. The hardened paint film exhibits good adhesion properties.

A salt fog evaluation is conducted. These results are summarized in Table 2. Properties are tested in accordance with the procedures:

| Test | ASTM Method |
|---|---|
| Salt Fog Exposure | B117-73 |
| Rusting | D610-68 |
| Blistering | D714-56 |

COMPARATIVE EXAMPLE B

In this Comparative Example, no anti-corrosive agent is added to a 4:1 oil/alkyd formulation. The 4:1 oil/alkyd paint is prepared according to the following formula:

| Ingredient | Generic Name | Manufacturer | Formulation (pounds)[1] |
|---|---|---|---|
| Raw Linseed Oil | Raw Linseed Oil | Spencer Kellogg | 150.0 |
| Aroplaz 1271 | 100% Solids Alkyd Resin | Spencer Kellogg | 78.4 |
| Pfizer R-2899 | Red Iron Oxide | Pfizer | 100.0 |
| Gama-Sperse 80 | Calcium Carbonate | Georgia Marble | 409.0 |

Disperse at High Speed for 15 Minutes to Obtain a Hegman Gauge Reading of 4 N.S. and add:

| Ingredient | Generic Name | Manufacturer | Formulation (pounds)[1] |
|---|---|---|---|
| Raw Linseed Oil | Raw Linseed Oil | Spencer Kellogg | 159.0 |
| 6% Manganese Nuxtra | Drier | Nuodex | 2.6 |
| 6% Zirconium Nuxtra | Drier | Nuodex | 9.7 |
| 6% Cobalt Nuxtra | Drier | Nuodex | 2.6 |

[1] Basic formulation; actual amounts used are much less but proportional.

The above formulation was applied to cold rolled steel panels to give a dry film thickness of 37.5 microns. A salt fog evaluation is conducted. These results are summarized in Table 2. Properties are tested in accordance with procedures:

| Test | ASTM Method |
|---|---|
| Salt Fog Exposure | B117-73 |
| Rusting | D610-68 |
| Blistering | D714-56 |

TABLE 2

Salt Fog Exposure Results (175 Hours)

| Sample Description | Blistering | | Rusting | |
|---|---|---|---|---|
| | Scribe | Panel | Scribe | Panel |
| Example 2 | 10 | 10 | 8 | 10 |
| Comparative Example B | 8D | 8D | 1 | 1 |

The invention being thus described and exemplified, it will be obvious that the invention may be varied in many ways. Such variations are not to be regarded as a departure from the spirit and scope of the invention and all such modifications are intended to be included within the scope of the following claims.

What is claimed is:

1. A solvent-free coating composition for protecting a surface from corrosion comprising:
   (a) a solvent-free coating material; and
   (b) a non-pigmentary anti-corrosive agent comprised of a calcined mixture consisting essentially of from about 5 to about 95% by weight of magnesium oxide and from about 5 to about 95% by weight of zinc oxide.

2. The solvent-free coating composition of claim 1 wherein the coating material is an oleoresinous system, epoxy system, polyester system or urethane system.

3. The solvent-free coating composition of claim 2 wherein the coating material is an epoxy-based material.

4. The solvent-free coating composition of claim 1 wherein the coating material is present in an amount ranging from about 25 to about 99% by weight of the coating composition.

5. The solvent-free coating composition of claim 4 wherein the coating material is present in an amount ranging from about 50 to about 90% by weight of the coating composition.

6. The solvent-free coating composition of claim 1 wherein the non-pigmentary anti-corrosive agent is present in an amount ranging from about 1 to about 75% by weight of the coating composition.

7. The solvent-free coating composition of claim 6 wherein the non-pigmentary anti-corrosive agent is present in an amount ranging from about 10 to about 50% by weight of the coating composition.

8. The solvent-free coating composition of claim 1 wherein up to about 10% by weight of at least one of the magnesium oxide and zinc oxide is replaced with at least one of molybdenum trioxide, barium oxide and strontium oxide.

9. The solvent-free coating composition of claim 1 wherein the calcined mixture consists essentially of from about 20 to about 80% by weight of magnesium oxide and from about 20 to about 80% by weight of zinc oxide.

10. The solvent-free coating composition of claim 1 wherein the calcined mixture consists essentially of from about 50 to about 70% by weight of magnesium oxide and from about 30 to about 50% by weight of zinc oxide.

11. The solvent-free coating composition of claim 1 wherein from about 1 to about 40% by weight of the non-pigmentary anti-corrosive agent is substituted with at least one compound formed from a divalent, trivalent or tetravalent metal cation and an anion selected from phosphates, phosphites, borates, borophosphates, borophosphites and mixtures thereof.

12. The solvent-free coating composition of claim 11 wherein the compound is selected from the group consisting of calcium phosphate, calcium borate, calcium phosphite, zinc phosphite, zinc phosphate, zinc borate, magnesium phosphite and mixtures thereof.

13. The solvent-free coating composition of claim 12 wherein the compound is crystalline calcium phosphite.

14. The solvent-free coating composition of claim 1 wherein the coating composition further comprises from about 1 to about 74% by weight of a filler wherein the total amount of anti-corrosive agent and filler is less than about 75% by weight of the coating composition.

15. The solvent-free coating composition of claim 14 wherein the filler is selected from the group consisting of talc, silica, barium sulfate, calcium sulfate, calcium carbonate, calcium silicate, titanium dioxide, iron oxides, mica, aluminum silicate, clay and mixtures thereof.

16. The solvent-free coating composition of claim 1 wherein from about 1 to about 10% by weight of the non-pigmentary anti-corrosive agent is substituted with an uncalcined compound selected from the group consisting of molybdenum trioxide, strontium oxide, barium oxide, calcium oxide and mixtures thereof.

17. A solvent-free coating composition for increasing the corrosion resistance of a surface, said composition comprising:
   (a) a solvent-free coating material; and
   (b) a non-pigmentary anti-corrosive agent comprised of a calcined mixture consisting essentially of
      (i) from about 5 to about 95% by weight of magnesium oxide and from about 5 to about 95% by weight of zinc oxide wherein the percentages are based on the total amount of (i), and
      (ii) calcium oxide
   wherein the amount of (i) is from about 10 to about 99 parts by weight and the amount of (ii) is from about 1 to about 90 parts by weight with the sum of the amounts of (i) and (ii) being 100 parts by weight.

18. The solvent-free coating composition of claim 17 wherein the coating material is present in an amount ranging from about 25 to about 99% by weight of the coating composition.

19. The solvent-free coating composition of claim 18 wherein the coating material is present in an amount ranging from about 50 to about 90% by weight of the coating composition.

20. The solvent-free coating composition of claim 17 wherein the coating material is an oleoresinous system, epoxy system, polyester system or urethane system.

21. The solvent-free coating composition of claim 20 wherein the coating material is an epoxy system.

22. The solvent-free coating composition of claim 20 wherein the coating material is an urethane-based paint.

23. The solvent-free coating composition of claim 20 wherein the coating material is an oleoresinous system.

24. The solvent-free coating composition of claim 17 wherein the non-pigmentary anti-corrosive agent is present in an amount varying from about 1 to about 75% by weight of the coating composition.

25. The solvent-free coating composition of claim 24 wherein the non-pigmentary anti-corrosive agent is present in an amount varying from about 10 to about 50% by weight of the coating composition.

26. The solvent-free coating composition of claim 17 wherein up to about 10% by weight of at least one of the magnesium oxide, zinc oxide and calcium oxide is replaced with at least one of molybdenum trioxide, barium oxide and strontium oxide.

27. The solvent-free coating composition of claim 17 wherein (i) of the calcined mixture consists essentially of from about 20 to about 80% by weight of magnesium oxide and from about 20 to about 80% by weight of zinc oxide.

28. The solvent-free coating composition of claim 17 wherein (i) of the calcined mixture consists essentially of from about 50 to about 70% by weight of magnesium oxide and from about 30 to about 50% by weight of zinc oxide.

29. The solvent-free coating composition of claim 17 wherein from about 1 to about 40% by weight of the non-pigmentary anti-corrosive agent is substituted with at least one compound formed from a divalent, trivalent or tetravalent metal cation and an anion selected from phosphates, phosphites, borates, borophosphates, borophosphites and mixtures thereof.

30. The solvent-free coating composition of claim 29 wherein the compound is selected from the group consisting of calcium phosphate, calcium borate, calcium phosphite, zinc phosphite, zinc phosphate, zinc borate, magnesium phosphite and mixtures thereof.

31. The solvent-free coating composition of claim 30 wherein the compound is crystalline calcium phosphite.

32. The solvent-free coating composition of claim 17 wherein the coating composition further comprises from about 1 to about 74% by weight of a filler wherein the total amount of non-pigmentary anti-corrosive agent and filler is less than about 75% by weight of the coating composition.

33. The solvent-free coating composition of claim 32 wherein the filler is selected from the group consisting of talc, silica, barium sulfate, calcium sulfate, calcium carbonate, calcium silicate, titanium dioxide, iron oxides, mica, aluminum silicate, clay and mixtures thereof.

34. The solvent-free coating composition of claim 33 wherein the filler is calcium carbonate.

35. The solvent-free coating composition of claim 17 wherein from about 1 to about 10% by weight of the non-pigmentary anti-corrosive agent, is substituted with an uncalcined compound selected from the group consisting of molybdenum trioxide, strontium oxide, barium oxide, calcium oxide and mixtures thereof.

36. A process for protecting a surface from corrosion comprising:
 (a) coating the surface with a solvent-free coating composition comprising
  (i) a solvent-free coating material; and
  (ii) a non-pigmentary anti-corrosive agent comprised of a calcined mixture consisting essentially of from about 5 to about 95% by weight of magnesium oxide and from about 5 to about 95% by weight of zinc oxide; and
 (b) permitting the coating composition to harden.

37. The process of claim 36 wherein the solvent-free coating material is a polyester system or urethane system and the hardened coating composition has a thickness in the range of from about 5 to about 150 microns.

38. The process of claim 37 wherein the solvent-free coating material is an oil/alkyd system and the hardened coating composition has a thickness in the range of from about 25 to about 150 microns.

39. The process of claim 36 wherein the solvent-free coating material is an epoxy system and the hardened coating composition has a thickness in the range of from 25 to 500 microns.

40. A process for protecting a surface from corrosion comprising:
 (a) coating the surface with a solvent-free coating composition comprising
  (i) a solvent-free coating material; and
  (ii) a non-pigmentary anti-corrosive agent comprised of a calcined mixture consisting essentially of (1) from about 5 to about 95% by weight of magnesium oxide and from about 5 to about 95% by weight of zinc oxide wherein the percentages are based on a total amount of (1), and (2) calcium oxide
  wherein the amount of (1) is from about 10 to about 99 parts by weight and the amount of (2) is from 1 to about 90 parts by weight with the sum of the amounts of (1) and (2) being 100 parts by weight; and
 (b) permitting the coating composition to harden.

41. The process of claim 40 wherein the solvent-free coating material is a polyester system or urethane system and the hardened coating composition has a thickness in the range of from about 5 to about 150 microns.

42. The process of claim 41 wherein the solvent-free coating material is an oil/alkyd system and the hardened coating composition has a thickness in the range of from about 25 to about 150 microns.

43. The process of claim 40 wherein the solvent-free coating material is an epoxy system and the hardened coating composition has a thickness in the range of from about 25 to about 500 microns.

44. The solvent-free coating composition of claim 1 wherein the coating material is a powder coating system.

45. The solvent-free coating composition of claim 17 wherein the coating material is a powder coating system.

* * * * *